US006287993B1

(12) United States Patent
Fu et al.

(10) Patent No.: US 6,287,993 B1
(45) Date of Patent: Sep. 11, 2001

(54) LONG-LASTING PHOSPHORESCENT GLASSES AND GLASS-CERAMICS

(75) Inventors: Jie Fu, Sagamihara; Yasuo Ochi, Kunitachi; Susumu Uehara, Sagamihara, all of (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

(21) Appl. No.: 09/398,593

(22) Filed: Sep. 17, 1999

(30) Foreign Application Priority Data

Sep. 22, 1998 (JP) .................................... 10-268137
Apr. 20, 1999 (JP) .................................... 11-112742

(51) Int. Cl.$^7$ ........................... C09K 11/55; C09K 11/59; C03C 10/04
(52) U.S. Cl. .................................. 501/5; 501/2; 501/32; 252/301.4 H; 252/301.4 F; 252/301.6 R; 252/301.6 H
(58) Field of Search ............................ 501/2, 5, 32, 62, 501/54, 57, 58, 59, 60, 63, 65, 66, 68, 69, 70, 72, 73, 74, 75, 76, 77, 78, 79; 252/301.4 F, 301.6 F, 301.4 H, 301.6 H (56) References Cited

U.S. PATENT DOCUMENTS 2,219,895 * 10/1940 Hanlein ................... 252/301.6 R
3,928,229 * 12/1975 Neuroth ................... 252/301.4 F
5,387,558 * 2/1995 Grossman ................... 501/64
6,123,872 * 9/2000 Yamazaki et al. ............ 252/301.6 R

FOREIGN PATENT DOCUMENTS

1225434 * 3/1971 (GB) .

* cited by examiner

Primary Examiner—C. Melissa Koslow
(74) Attorney, Agent, or Firm—Hedman & Costigan, PC (57) ABSTRACT

Long-lasting phosphorescent glasses and glass-ceramics have a composition containing 30–65 mol % $SiO_2$ and 20–50 mol % ZnO as basic ingredients and may also contain, as an activator or an auxiliary activator, 0–5 mol % $Ln_xO_y$ where L n is an element or elements selected from the group consisting of Y, Ce, Pr, Nd, Sm, Eu, Gd, Tb, Dy, Ho, Er, Tm, Yb, Lu and Mn. In one aspect of the invention, long-lasting phosphorescent glass-ceramics have a composition containing 30–70 mol % $SiO_2$, 5–40 mol % MgO and 10–55 mol % MO where M is an element or elements selected from the group consisting of Ca, Sr and Ba as basic ingredients. The composition further includes 0.0001–5 mol % $Eu_2O_3$ as an activator and 0.0001–6 mol % $Ln_2O_3$ as an auxiliary activator where Ln is an element or elements selected from the group consisting of Ce, Pr, Nd, Sm, Gd, Tb, Dy, Ho, Er, Tm, Yb and Lu.

11 Claims, 6 Drawing Sheets

LONG-LASTING PHOSPHORESCENT GLASSES AND GLASS-CERAMICS

BACKGROUND OF THE INVENTION

This invention relates to long-lasting phosphorescent glasses and glass-ceramics emitting a long persistent phosphorescence upon radiation of ultraviolet ray and visible light and so on, more particularly, to long-lasting phosphorescent glasses and glass-ceramics having a long-lasting phosphorescence and being capable of providing a rich variety of colors in the emitted phosphorescence.

Fluorescence is a phenomenon that a material emits visible ray when excited by an excitation source applied from outside. A fluorescent lamp, a discharge tube and cathode ray tube (CRT) emit fluorescence. A material which emits fluorescence is called a phosphor. When light emitted by a phosphor lasts after stoppage of excitation for duration of time sufficient for the light to be perceived by the eye, i.e., about 0.1 second or longer, the light is called phosphorescence. A phosphor which has a long persistent phosphorescence lasting for several hours at room temperature is called a long-lasting phosphor or a light storage phosphor.

Known in the art of long-lasting phosphors are sulfides and oxides. ZnS:Cu is a typical sulfide type long-lasting phosphor which has been practically used for several decades. The ZnS:Cu long-lasting phosphor has the disadvantage that its after-glow lasts for a relatively short duration of time, i.e., about three hours at the longest. Further, this type of phosphor has the defect that a decomposition reaction of $ZnS+H_2O \rightarrow ZnO+H_2S$ takes place under the coexistence of ultraviolet ray contained in the sunlight and moisture contained in the air, making particles of the phosphor become black in color and, as a result, the after-glow characteristics significantly deteriorate within a relatively short period of time. For this reason, this type of phosphor has only limited applications such as a luminous watch and a night-time display of a location in a house.

On the other hand, there are reported, as typical oxide type long-lasting phosphors, $m(Sr_{1-x}Eu_x) \cdot nAl_2O_3 \cdot yB_2O_3$ disclosed in Chinese Patent No. CN1053807A, $Zn_{1-X-Y}Mg_X \cdot Mn_Y$ and $Sr_{1-X}Al_2O_{4-X}:Eu_X,Ln_Y$ disclosed in Japanese Patent Application Laid-open Publication No. Hei 8-127772, $(Zn_{1-X-Y}Mg_XMn_Y)O \cdot n(Ga_{1-Z}Al_Z)_2O_3$ disclosed in Japanese Patent Application Laid-open Publication No. Hei 10-88126, and $m(Sr_{1-a}M^1{}_a)O \cdot n(Mg_{1-b}M^2{}_b)O \cdot 2(Si_{1-c}Ge_c)O_2$: $Eu_x,Ln_y$ disclosed in Japanese Patent Application Laid-open Publication No. Hei 9-194833. These long-lasting phosphors have high phosphorescence brightness and long lasting phosphorescence and also have good chemical durability and light-proof characteristics. These long-lasting phosphors are expected to have applications which, in addition to the conventional usage for luminous watches and night-time display of a location in a house, include disaster prevention marks, position indication marks for preventing danger and decorative articles. These long-lasting phosphors, however, are all made by the sintering process which involves complex manufacturing processes and according to which it is difficult to form a product of a desired shape. Besides, in these long-lasting phosphors, it is difficult to obtain a transparent product.

It is, therefore, an object of the invention to provide long-lasting phosphorescent glasses and glass-ceramics which, while realizing high phosphorescence brightness, long lasting phosphorescence, excellent chemical durability and light-proof characteristics, can be easily manufactured and easily formed to a desired shape and which provide both transparent and opaque products as desired.

SUMMARY OF THE INVENTION

For achieving the above described object of the invention, the inventors of the present invention have conducted experiments about glasses containing $SiO_2$ and $ZnO$ as their basic ingredients and found, which has led to the present invention, that a specific composition only in these glasses exhibits long-lasting phosphorescence, that phosphorescence brightness is improved and there is provided a rich variety in color of phosphorescence by adding a certain rare earth metal or Mn and that $Zn_2SiO_4$ and/or $ZnGa_2O_4$ crystal or crystals are formed by crystallizing these glasses whereby glass-ceramics having even better long-lasting phosphorescence characteristics can be realized.

According to the invention, there are provided long-lasting phosphorescent glasses and glass-ceramics having a composition comprising in mol %:

| | |
|---|---|
| $SiO_2$ | 30–65% |
| $ZnO$ | 20–50% |
| $Al_2O_3$ | 0–20% |
| $Ga_2O_3$ | 0–20% |
| $B_2O_3$ | 0–15% |
| MO | 0–20% | where M is an element or elements selected from the group consisting of Mg, Ca, Sr and Ba

| | |
|---|---|
| $R_2O$ | 0–15% | where R is an element or elements selected from the group consisting of Li, Na and K, and

| | |
|---|---|
| $P_2O_5 + ZrO_2 + SnO_2$ | 0–8% | said composition further comprising 0–5 mol % of $Ln_xO_y$ as an activator or auxiliary activator where Ln is an element or elements selected from the group consisting of Y, Ce, Pr, Nd, Sm, Eu, Gd, Tb, Dy, Ho, Er, Tm, Yb, Lu and Mn.

In one aspect of the invention, M in the composition is an element or elements selected from the group consisting of Ca, Sr and Ba.

In another aspect of the invention, Ln in the composition is an element or elements selected from the group consisting of Y, Ce, Pr, Nd, Sm, Eu, Gd, Tb, Dy, Ho, Er, Tm, Yb, Lu and Mn and, in case Eu or Dy is added, said glass or glass-ceramics contain either Eu or Dy only.

In another aspect of the invention, Ln is Tb and/or Mn.

In another aspect of the invention, the glass or glass-ceramics comprise $Zn_2SiO_4$ and/or $ZnGa_2O_4$ crystal phase or phases.

In comparison to ceramics which are made by sintering, glass-ceramics have the following five advantages:
(1) No troublesome mixing of raw materials is required.
(2) By stirring during melting of raw materials to glass, a very homogeneous product can be obtained and hence irregularity in the product can be avoided.
(3) A desire shape can be realized easily by utilizing the features of glass.
(4) A transparent product can be obtained by controlling conditions of heat treatment.

(5) In a case where powder is required, glass-ceramics can be easily crushed to powder since the temperature of final heat treatment is relatively low.

For these reasons, if long-lasting phosphorescent glass-ceramics are realized, improvement in the physical properties and wide applications utilizing the above described advantages of glass-ceramics over ceramics can be expected for such long-lasting phosphorescent glass-ceramics.

The inventors of the present invention have conducted experiments about glasses having $SiO_2$ and alkaline earth metal oxides as its basic ingredients and being added with a rare earth metal element and found that, by heat treating glass having a specific composition, long-lasting phosphorescent glass-ceramics can be obtained which exhibit long-lasting phosphorescence, high brightness and rich variety in color of the phosphorescence. Further, the inventors have found that long-lasting phosphorescent glass-ceramics obtained by mixing a base glass of these glass-ceramics with other specific materials and sintering the mixture have significantly improved lasting phosphorescence characteristics over the prior art long-lasting phosphors made of ceramics which are made by the sintering process.

Long-lasting phosphorescent glass-ceramics in this aspect of the invention have a composition in mol % of:

| | |
|---|---|
| $SiO_2$ | 30–70% |
| $GeO_2$ | 0–10% |
| MgO | 5–40% |
| MO | 10–55% | where M is an element or elements selected from the group consisting of Ca, Sr and Ba

| | |
|---|---|
| $B_2O_3$ | 0–15% |
| $Y_2O_3$ | 0–10% |
| $Sc_2O_3$ | 0–10% |
| $Al_2O_3$ | 0–10% |
| $Ga_2O_3$ | 0–15% |
| MeO | 0–10% | where Me is an element or elements selected from the group consisting of Be, Zn, Cd and Pb

| | |
|---|---|
| $R_2O$ | 0–6% | where R is an element or elements selected from the group consisting of Li, Na and K

| | |
|---|---|
| Cl + F | 0–8% |
| $Bi_2O_3$ | 0–8% |
| $P_2O_5 + ZrO_2 + SnO_2$ | 0–6% and |
| $Sb_2O_3 + As_2O_3$ | 0–4%, | said composition further comprising in mol %, as an activator,

| | |
|---|---|
| $Eu_2O_3$ | 0.0001–5% | and, as an auxiliary activator,

| | |
|---|---|
| $Ln_2O_3$ | 0.0001–6% | where Ln is an element or elements selected from the group consisting of Ce, Pr, Nd, Sm, Gd, Tb, Dy, Ho, Er, Tm, Yb and Lu.

In another aspect of the invention, the long-lasting phosphorescent glass-ceramics comprise 0.005–10 mol % of $B_2O_3$.

In another aspect of the invention, the long-lasting phosphorescent glass-ceramics comprise 0.005–6 mol % of $Y_2O_3$.

In another aspect of the invention, the long-lasting phosphorescent glass-ceramics comprise 0.005–6 mol % of $Al_2O_3$.

In another aspect of the invention, the long-lasting phosphorescent glass-ceramics comprise 0.005–5 mol % of $P_2O_5+ZrO_2+SnO_2$.

In another aspect of the invention, the phosphorescent glass-ceramics comprise, as a predominant crystal phase, $M_2MgSi_2O_7$ where M is an element or elements selected from the group consisting of Ca, Sr and Ba.

In another aspect of the invention, the long-lasting phosphorescent glass-ceramics are obtained by heat treating a base glass having the above described composition.

In still another object of the invention, the long-lasting phosphorescent glass-ceramics are obtained by mixing a base glass having the above described composition with one or more of compounds selected from the group consisting of $SiO_2$, $ZrO_2$, $B_2O_3$, $Al_2O_3$, $Y_2O_3$, BaO, SrO, CaO, MgO, $Eu_2O_3$, $Nd_2O_3$, $Dy_2O_3$, $Ho_2O_3$ and $Tm_2O_3$ and compounds which can be converted to them, and sintering a mixture of the base glass and the compound or compounds.

BRIEF DESCRIPTION OF THE DRAWINGS

In the accompanying drawings.

DETAILED DESCRIPTION OF THE INVENTION

The compositions of glass and glass-ceramics of the present invention and the compositions of the base glass for these glass and glass-ceramics are expressed in mol % on oxide basis. Reasons for limiting the range of amount of each ingredient in the glass and glass-ceramics having $SiO_2$ and ZnO as their basic ingredients will now be described.

$SiO_2$ is an essential ingredient for forming glass. When this glass is crystallized to form glass-ceramics having excellent lasting phosphorescence characteristics, this oxide is an important ingredient for forming $Zn_2SiO_4$ crystal which is a host crystal improving the lasting phosphorescence characteristics. If the amount of $SiO_2$ is below 30 mol %, the base glass becomes instable whereas if the amount of this ingredient exceeds 65 mol %, difficulty arises in melting of the base glass. Therefore, in both glass and glass-ceramics, the amount of this ingredient should be limited within a range from 30 mol % to 65 mol %. A preferable range of this ingredient is 35–65 mol %.

ZnO is an essential ingredient for imparting the phosphorescence characteristics to the glass and this ingredient is effective also for reducing the melting point of the glass. In crystallizing the glass to glass-ceramics having excellent phosphorescence characteristics, this ingredient is an essential ingredient for forming host crystal $Zn_2SiO_4$ or $ZnGa_{24}$ which improves the phosphorescence characteristics. If the amount of ZnO is below 20 mol %, glass having excellent characteristics cannot be obtained and, in case the glass is crystallized to glass-ceramics, difficulty arises in growing of the host crystal resulting in difficulty in producing glass-ceramics having excellent phosphorescence characteristics. If the amount of this ingredient exceeds 50 mol %, the glass becomes instable with the result that glass or glass-ceramics having excellent phosphorescence characteristics cannot be produced.

$Al_2O_3$ or $Ga_2O_3$ contributes to stability of the glass and improvement in phosphorescence brightness. If the amount of this ingredient exceeds 20 mol %, stability of the glass and phosphorescence brightness are reduced. In crystallizing the glass to glass-ceramics, $Ga_2O_3$ is an ingredient for forming $ZnGa_2O_4$ crystal which improves the phosphorescence characteristics. For producing this crystal phase, the amount of $Ga_2O_3$ should be 5 mol % or over.

$B_2O_3$ is effective for improving stability and melting property of the glass and may be added up to 15 mol %.

Alkaline earth oxides (MgO, CaO, SrO and BaO) and alkali oxides ($Li_2O$, $Na_2O$ and $K_2O$) are effective for reducing the melting point of the glass and, therefore, one or more alkaline earth oxides may be added in the total amount of up to 20 mol % and one or more alkali oxides may be added in the total amount of up to 15 mol %. As to the alkaline earth oxides, one or more oxides selected from CaO, SrO and BaO are preferable for achieving the above described effects.

$P_2O_5$, $ZrO_2$ and $SnO_2$ may be added in the case of producing the glass-ceramics. The addition of one or more of these ingredients facilitates growth of the desired crystal. The amount of these ingredients should however be restricted to 8 mol % or below. If the amount of addition exceeds this limit, melting property and stability of the base glass are deteriorated.

Rare earth element Ln (element or elements selected from the group consisting of Y, Ce, Pr, Nd, Sm, Eu, Gd, Tb, Dy, Ho, Er, Tm, Yb, Lu and Mn) contributes to improvement in the phosphorescence characteristics and variety in color of the phosphorescence. If the amount of these ingredients exceeds 5 mol %, the phosphorescence characteristics are decreased rather than increased due to concentration quenching. For better phosphorescence characteristics, one or more rare earth elements should preferably be selected from the group consisting of Y, Ce, Pr, Nd, Sm, Eu, Gd, Tb, Dy, Ho, Er, Tm, Yb, Lu and Mn and, in case Eu or Dy is selected, the composition should preferably contain Eu or Dy only and not both. It is more preferable that Ln is Tb and/or Mn.

For further improving the melting property of the glass, PbO, $Bi_2O_3$, $Ta_2O_5$, $As_2O_3$ or $Sb2O_3$ may be added. The amount of each ingredient should be restricted to 5 mol % or below. If the amount exceeding this limit is added, the desired phosphorescence characteristic is deteriorated.

The long-lasting phosphorescent glasses and glass-ceramics can be manufactured in the following manner.

Starting materials are weighed in a predetermined ratio and mixed uniformly and thereafter melted in a platinum or alumina crucible in air or nitrogen, or weak reducing atmosphere under a temperature within a range from 1300° C. to 1550° C. for one to six hours. Then, the molten glass is cast on an iron plate to obtain glass. In the case of manufacturing glass-ceramics, this glass is heat treated at a temperature higher than the glass transition temperature to produce glass-ceramics. Alternatively, long-lasting phosphorescent glass-ceramics can be produced by directly casting molten glass.

Reasons for limiting the amount of each ingredient of the glass-ceramics having $SiO_2$ and alkaline earth oxides as their basic ingredients will now be described.

$SiO_2$ is an essential ingredient for forming the glass and also forming a host crystal phase. If the amount of this ingredient is below 30 mol %, the base glass becomes instable whereas if the amount of this ingredient exceeds 70 mol %, difficulty arises in melting of the base glass. A preferable range of this ingredient is 32–65 mol % and more preferable range thereof is 32–60 mol %.

$GeO_2$ is an ingredient which performs a similar function to $SiO_2$. Substitution of a part of $SiO_2$ by $GeO_2$ does not affect forming of the glass but since $GeO_2$ is expensive, the amount of $GeO_2$ should be restricted to 10 mol % or below.

MgO is effective for reducing the melting point of the glass and also for forming a host crystal phase and therefore is an essential ingredient for imparting the phosphorescence characteristics to the glass-ceramics. For achieving excellent phosphorescence characteristics, MgO should be added in the amount of 5–40 mol %. A preferable range of this ingredient for achieving the above characteristics is 12–35 mol %.

CaO, SrO and BaO are effective for reducing the melting point of the glass and also constitute a host crystal together with MgO and at least one of these ingredients should be added. For obtaining the glass and excellent phosphorescence characteristics, the total amount of one or more of these ingredients should be within a range from 10 mol % to 55 mol %. A preferable total range is 15–55 mol %.

$B_2O_3$ is effective for improving stability and melting property of the glass and contributes to expansion of the vitrifying range and, therefore, this ingredient may be added up to 15 mol %. If the amount of this ingredient exceeds this limit, the phosphorescence characteristics are deteriorated. A preferable range of this ingredient is 0.005 to 10 mol %.

$Y_2O_3$, $Sc_2O_3$ and $Al_2O_3$ are effective for improving stability and melting property of the glass and producing alkaline earth metal silicate crystal phase by heat treatment and improving the phosphorescence characteristics and, therefore, may be added up to 10 mol % respectively. If the amount of each of these ingredients exceeds this limit, stability and phosphorescence brightness of the glass are reduced. A preferable range of this ingredient is 0.005–6 mol %.

$Ga_2O_3$ is effective, similarly to $Y_2O_3$, $Sc_2O_3$ or $Al_2O_3$, for improving stability and melting property of the glass, producing alkaline earth metal silicate crystal phase by heat treatment and improving the phosphorescence characteristics and variety in color of the phosphorescence and, therefore, may be added up to 15 mol %. If the amount of this ingredient exceeds this limit, stability and phosphorescence brightness are reduced. A preferable range of this ingredient is 0.005–10 mol %.

Divalent metal oxides (BeO, ZnO, CdO and PbO) and alkali oxides ($Li_2O$, $Na_2O$ and $K_2O$) are effective for reducing melting point of the glass and thereby improving the melting property of the glass and, therefore, one or more of the divalent metal oxides may be added in the total amount of up to 10 mol % and one or more of the alkali oxides may be added in the total amount of 6 mol %.

Halides and $Bi_2O_3$ are effective for reducing melting point of the glass and thereby improving the melting property of the glass and also improving the phosphorescence characteristics of the glass-ceramics. These ingredients may therefore be added up to 8 mol % respectively. If the amount of each ingredient exceeds this limit, stability and durability of the glass and the phosphorescence characteristics of the glass-ceramics are deteriorated.

By adding $P_2O_5$, $ZrO_2$, or $SnO_2$, growth of a desired crystal is facilitated and the phosphorescence characteristics thereby are improved. Particularly, the $P_2O_5$ ingredient, different from $ZrO_2$ and $SnO_2$, is a glass forming oxide and, therefore, contributes greatly to improvement in the melting property and stability. The total amount of one or more of these ingredients should however be restricted to 6 mol % or below. If the total amount exceeds this limit, the melting property, stability of the base glass and the phosphorescence characteristics of the glass-ceramics are deteriorated. A preferable range is 0.005–5 mol %.

$Sb_2O_3$ and/or $As_2O_3$ may be added as a refining agent or a reducing agent in melting glass. The total amount of one or both of these ingredients up to 4 mol % will suffice.

$Eu_2O_3$ is an essential ingredient for phosphorescence. As a starting material, it is added in the form of $Eu^{3+}$ but, since it is $Eu^{2+}$ that imparts the phosphorescence characteristics which are the object of the invention, it must be converted to $Eu^{2+}$ by using a reducing agent or in a reducing atmosphere in the manufacturing process. If the amount of $Eu_2O_3$ is below 0.0001 mol %, absorption of light becomes poor and, as a result, phosphorescence brightness which can be visually recognized cannot be achieved. If this ingredient exceeds 5 mol %, concentration quenching takes place with resulting reduction in the phosphorescence brightness. A preferable amount range of this ingredient is 0.001–4 mol % and a more preferable range thereof is 0.003–3 mol %.

$Ln_2O_3$ (Ln being an element or elements selected from the group consisting of Ce, Pr, Nd, Sm, Gd, Tb, Dy, Ho, Er, Tm, Yb and Lu) is an ingredient which is effective for improving phosphorescence brightness and phosphorescence lasting time. This effect cannot be achieved sufficiently unless the total amount of one or both of these ingredients amounts to 0.0001 mol %. If the total amount exceeds 6 mol %, concentration quenching takes place which adversely affects the phosphorescence brightness. A preferable total amount range of this ingredient or ingredients is 0.001–5 mol % and a more preferable range is 0.01–5 mol %.

In one embodiment of the invention, glass-ceramics can be provided by mixing the base glass described above with other specific material and combining the mixture together by sintering. The specific materials which may be mixed with the base glass include $SiO_2$, $ZrO_2$, $B_2O_3$, $H_3BO_3$, $Al_2O_3$ $Al(OH)_3$, $Y_2O_3$, $BaCO_3$, $Ba(NO_3)_2$, $SrCO_3$, $Sr(NO_3)_2$, $CaCO_3$, $Ca(OH)_2$, MgO $Eu_2O_3$, $Nd_2O_3$, $Dy_2O_3$, $Ho_2O_3$ and $Tm_2O_3$. Among these materials, $H_3BO_3$ can be converted to $B_2O_3$, $Al(OH)_3$ can be converted to $Al_2O_3$, $BaCO_3$ and $Ba(NO_3)_2$ can be converted to BaO, $SrCO_3$ and $Sr(NO_3)_2$ can be converted to SrO, and $CaCO_3$ and $Ca(OH)_2$ can be converted to CaO. By combining one or more of these materials with the base glass, different phosphorescence characteristics can be obtained and phosphorescence brightness is remarkably improved over the conventional long-lasting phosphors. For achieving excellent phosphorescence characteristics, at least 0.5 wt % of glass must be present.

The long-lasting phosphorescent glass-ceramics containing $SiO_2$ and alkaline earth oxides as the basic ingredients can be manufactured in the following manner.

Starting materials are weighed at a predetermined ratio and mixed uniformly and thereafter melted in a platinum or alumina crucible in air or an atmosphere using a reducing agent, or in a reducing atmosphere at a temperature within a range from 1250° C. to 1600° C. for one to ten hours. In the case that the glass is made in air, it is preferable that the subsequent heat treatment is conducted in a reducing atmosphere. In the case that the glass is made in a reducing atmosphere or by using a reducing agent, it is preferable that the subsequent heat treatment is conducted in an inert gas atmosphere or a reducing atmosphere. As the reducing agent, carbon powder or metal powder such powder of silicon, aluminum and zinc which do not adversely affect the composition of the glass may be added. In case a bulk product is to be produced, the molten glass is cast on an iron plate to obtain glass. Thereafter, this base glass is heat treated at a temperature within a range from 700° C. to 1250° C. for 0.5 hour to 36 hours to obtain long-lasting phosphorescent glass-ceramics in the form of bulk.

In case long-lasting phosphorescent glass-ceramics in the form of powder are to be produced, bulk glass or base glass provided by putting bulk glass into water to quench it for facilitating crushing is crushed to powder and thereafter the crushed glass is heat treated to produce long-lasting phosphorescent glass-ceramics in the form of powder.

Since the long-lasting phosphorescent glass-ceramics of the present invention have a glass phase and the temperature of heat treatment is relatively low, it is much easier to crush the glass-ceramics than the conventional long-lasting phosphorescent made of ceramics manufactured by the sintering process.

In case long-lasting phosphorescent glass-ceramics in the form of a thin film is to be produced, the base glass powder produced in the above described manner is dispersed in a solvent and coated uniformly over the surface of a substrate or ceramic product. The coated product is then subjected to heat treatment in a reducing atmosphere to produce a product which is coated with a thin film having phosphorescence characteristics.

The combined glass-ceramics of the base glass and other specific materials described above can be manufactured in the following manner.

The base glass having the above described composition is first manufactured and this base glass is crushed to powder.

This base glass powder is mixed well with the other specific materials and is sintered in a reducing atmosphere at a temperature within a range from 900° C. to 1600° C. for 0.5 hour to twelve hours to provide long-lasting phosphorescent glass-ceramics. The long-lasting phosphorescent glass-ceramics manufactured in this manner can be crushed more easily than the conventional long-lasting phosphorescent made by the conventional sintering process. Further, by mixing the base glass made in the above described manner with the other specific materials, press-forming the mixture by using a mold and thereafter sintering the mixture in a reducing atmosphere at a temperature within the above described temperature range, long-lasting phosphorescent glass-ceramics in the form of bulk can be produced.

EXAMPLES

Examples of the present invention will now be described. It is to be noted that the scope of the present invention is not limited to these examples.

Example 1

Figure 1:
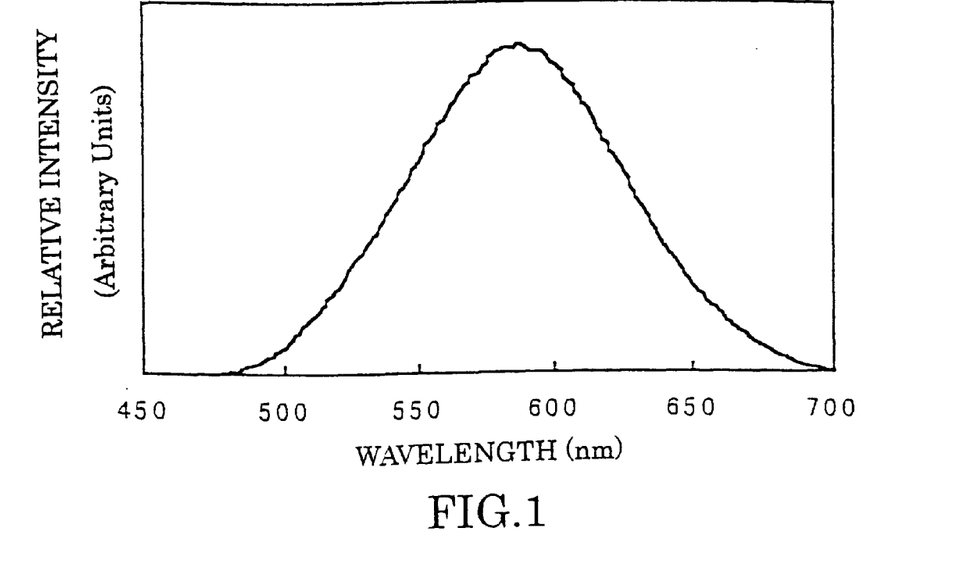
FIG. 1 is a graph showing the emission spectrum of Example 1 after stoppage of the excitation.

As raw materials, $SiO_2$, $Al(OH)_3$, ZnO, $LiCO_3$ and $MnCO_3$ were used, These materials were weighed so that the composition containing, in molar ratio, $SiO_2=50$, $Al_2O_3=4$, ZnO=36, $Li_2O=6$ and MnO=0.5 would be obtained. These materials were mixed uniformly and melted in a reducing atmosphere at 1480° C. for two hours. Then, the molten glass was cast on an iron plate to produce glass. After illuminated with ultraviolet ray, this glass exhibited an emission characteristic having a peak in the vicinity of 590 nm as shown in FIG. 1 and orange-colored phosphorescence was observed with the naked eye.

Example 2

Figure 2:
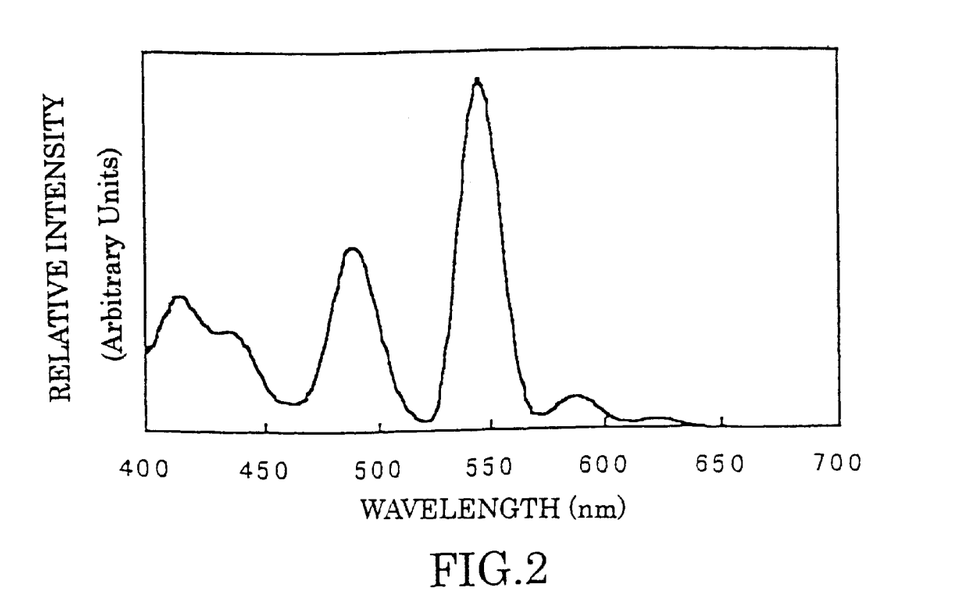
FIG. 2 is a graph showing the emission spectrum of Example 2 after stoppage of the excitation.

As raw materials, $SiO_2$, $Al(OH)_3$, ZnO and $Tb_4O_7$ were used. These materials were weighed so that the composition containing, in molar ratio, $SiO_2=50$, $Al_2O_3=10$, ZnO=40 and $Tb_2O_3=0.4$ would be obtained. These materials were mixed uniformly and melted under a air atmosphere at 1500° C. for 2.5 hours. Then, the molten glass was cast on an iron plate to produce glass. After illuminated with ultraviolet ray, this glass exhibited an emission characteristic having a peak in the vicinity of 545 nm as shown in FIG. 2 and green phosphorescence was observed with the naked eye.

Examples 3 to 16 were prepared in the same manner as in Example 1 or Example 2. The compositions and colors of the phosphorescence are described in Table 1.

TABLE 1

| Example No. | glass composition | color of Phosphorescence* |
|---|---|---|
| 1. | $54SiO_2.4Al_2O_3.36ZnO.6Li_2O.0.5MnO$ | orange |
| 2. | $50SiO_2.10Al_2O_3.40ZnO.0.4Tb_2O_3$ | green |
| 3. | $52SiO_2.6Al_2O_3.37ZnO.5K_2O.0.1MnO$ | orange |
| 4. | $50SiO_2.10Al_2O_3.40ZnO.0.7MnO$ | orange |
| 5. | $50SiO_2.10Al_2O_3.40ZnO.0.3MnO.0.1Nd_2O_3$ | orange |
| 6. | $50SiO_2.8Al_2O_3.37ZnO.5CaCO.1MnO$ | orange |
| 7. | $54SiO_2.9Al_2O_3.36ZnO.1P_2O_5.0.3Tb_2O_3$ | green |
| 8. | $44SiO_2.10Al_2O_3.46ZnO.0.2Tb_2O_3$ | green |
| 9. | $50SiO_2.3Al_2O_3.35ZnO.15MgO.0.2Tb_2O_3$ | green |
| 10. | $48SiO_2.8Al_2O_3.39ZnO.5B_2O_3.1Tb_2O_3$ | green |
| 11. | $50SiO_2.10Al_2O_3.40ZnO.0.2Tb_2O_3.0.1Tm_2O_3$ | green |
| 12. | $50SiO_2.10Al_2O_3.40ZnO.0.2Tb_2O_3.0.1Nd_2O_3$ | green |
| 13. | $50SiO_2.10Al_2O_3.40ZnO.0.2Tb_2O_3.0.1Dy_2O_3$ | green |
| 14. | $50SiO_2.10Al_2O_3.40ZnO.0.2Tb_2O_3.1Gd_2O_3$ | green |

TABLE 1-continued

| Example No. | glass composition | color of Phosphorescence* |
|---|---|---|
| 15. | $52SiO_2.5Al_2O_3.38ZnO.0.2Tb_2O_3.2Y_2O_3$ | green |
| 16. | $50SiO_2.10Al_2O_3.40ZnO.0.2Tm_2O_3$ | blue |

*emission color after stoppage of ultraviolet ray radiation

Example 17

Figure 3:
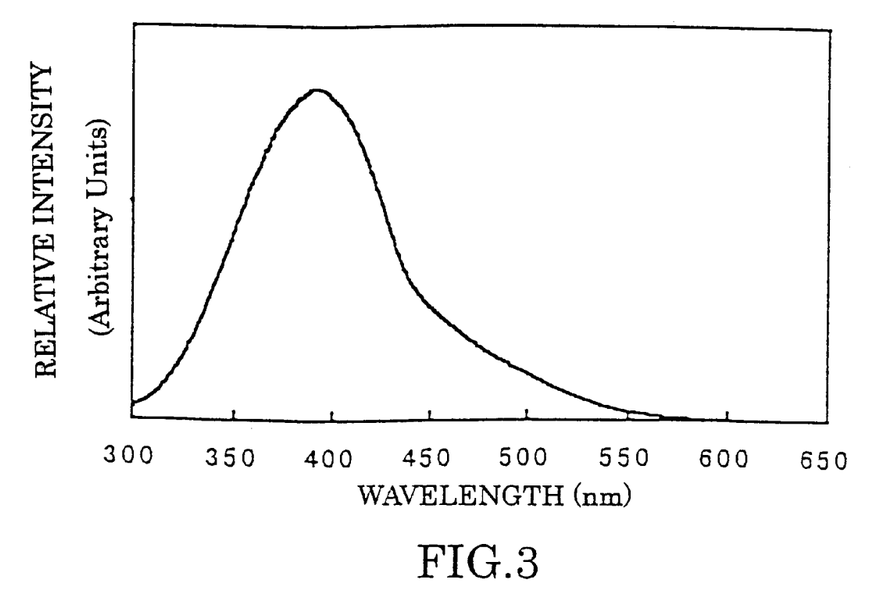
FIG. 3 is a graph showing the emission spectrum of Example 17 after stoppage of the excitation.

Glass having the composition of $50SiO_2.10Al_2O_3.40ZnO.0.2Pr_2O_3$ in molar ratio was prepared in the same manner as in Example 2. This glass was heat treated in a reducing atmosphere at 1000° C. for two hours to produce glass-ceramics. The glass-ceramics obtained were found to have $Zn_2SiO_2$ crystal phase by X-ray diffraction and had an emission characteristic having a peak in the vicinity of 390 nm as shown in FIG. 3. Blue phosphorescence was observed with the naked eye.

Example 18

Figure 4:
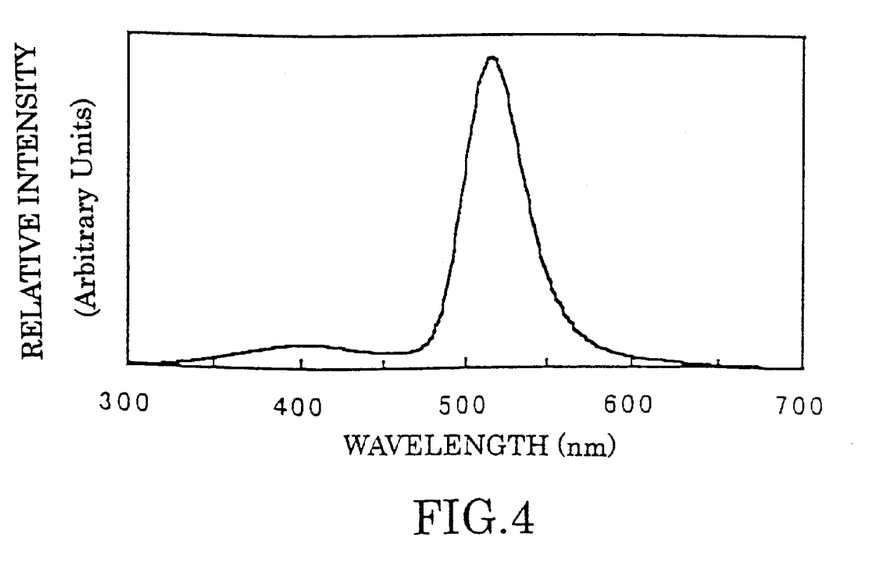
FIG. 4 is a graph showing the emission spectrum of Example 18 after stoppage of the excitation.

Glass having the composition of $40SiO_2.10B_2O_3.12Ga_2O_3.28ZnO.10MgO.0.3MnO$ in molar ratio was prepared in the same manner as in Example 2. This glass was heat treated in a reducing atmosphere at 900° C. for two hours to produce glass-ceramics. The glass-ceramics obtained were found to have $Zn_2SiO_4$ and $ZnGa_2O_4$ crystal phases by X-ray diffraction and had an emission characteristic having a peak in the vicinity of 515 nm as shown in FIG. 4. Green phosphorescence was observed with the naked eye.

Examples 19 to 40 were prepared in the same manner as in Example 18. Tables 2 and 3 show compositions, heat treatment conditions, predominant crystal phases and colors of phosphorescence of the respective examples.

It will be understood from Tables 1 to 3 that the long-lasting phosphorescent materials of the present invention have a wide variety of colors of phosphorescence ranging from blue to red. It was confirmed that the long-lasting phosphorescent materials of the present invention had emission lasting more than three hours in the dark after stoppage of radiation of ultraviolet ray.

In the following tables, "color" means color of phosphorescence after stoppage of radiation of ultraviolet ray and reducing atmosphere is abbreviated as "red. atm.". Example 39 was produced by casting.

TABLE 2

| Example No. | Glass-ceramic composition | Heat treatment condition | Predominant crystal phase | Color |
|---|---|---|---|---|
| 17 | $50SiO_2.10Al_2O_3.40ZnO.$ $0.2Pr_2O_3$ | 1000° C.-2H red. atm. | $Zn_2SiO_4$ | blue |
| 18 | $40SiO_2.10B_2O_3.12Ga_2O_3.$ $28ZnO.10MgO.0.3MnO$ | 900° C.-2H red. atm. | $Zn_2SiO_4$ $ZnGa_2O_4$ | green |
| 19 | $50SiO_2.10Al_2O_3.40ZnO.$ $1P_2O_5$ | 950° C. red. atm. | $Zn_2SiO_4$ | blue |
|  |  | 700° C.-2H 950° C.-1H red. atm. | $Zn_2SiO_4$ | blue |
| 20 | $50SiO_2.10Al_2O_3.40ZnO.$ $1ZrO_2$ | 950° C.-2H red. atm. | $Zn_2SiO_4$ | blue |
| 21 | $50SiO_2.10Al_2O_3.40ZnO.$ $1SnO_2$ | 950° C.-2H red. atm. | $Zn_2SiO_4$ | blue |

TABLE 2-continued

| Example No. | Glass-ceramic composition | Heat treatment condition | Predominant crystal phase | Color |
|---|---|---|---|---|
| 22 | $50SiO_2.10Al_2O_3.40ZnO.$ $1K_2O$ | 950° C.-2H red. atm. | $Zn_2SiO_4$ | blue |
| 23 | $50SiO_2.10Al_2O_3.40ZnO.$ $0.2Tm_2O_3$ | 1000° C.-5H red. atm. | $Zn_2SiO_4$ | blue |
| 24 | $50SiO_2.10Al_2O_3.40ZnO.$ | 1050° C.-5H red. atm. | $Zn_2SiO_4$ | blue |
| 25 | $50SiO_2.10Al_2O_3.40ZnO.$ $0.4Nd_2O_3$ | 1000° C.-5H red. atm. | $Zn_2SiO_4$ | blue |

TABLE 3

| Example No. | Glass-ceramic composition | Heat treatment condition | Predominant crystal phase | Color |
|---|---|---|---|---|
| 26 | $50SiO_2.10Al_2O_3.40ZnO.$ $0.3La_2O_3$ | 1000° C.-5H red. atm. | $Zn_2SiO_4$ | blue |
| 27 | $50SiO_2.10Al_2O_3.40ZnO.$ $0.3Ce_2O_3$ | 1000° C.-5H red. atm. | $Zn_2SiO_4$ | blue |
| 28 | $50SiO_2.10Al_2O_3.40ZnO.$ $0.3Sm_2O_3$ | 1000° C.-5H red. atm. | $Zn_2SiO_4$ | blue |
| 29 | $50SiO_2.10Al_2O_3.40ZnO.$ $0.3Eu_2O_3$ | 1000° C.-5H red. atm. | $Zn_2SiO_4$ | blue |
| 30 | $50SiO_2.10Al_2O_3.40ZnO.$ $0.3Ho_2O_3$ | 1000° C.-5H red. atm. | $Zn_2SiO_4$ | blue |
| 31 | $50SiO_2.10Al_2O_3.40ZnO.$ $0.3Er_2O_5$ | 1000° C.-5H red. atm. | $Zn_2SiO_4$ | blue |
| 32 | $50SiO_2.10Al_2O_3.40ZnO.$ $0.3Yb_2O_3$ | 1000° C.-5H red. atm. | $Zn_2SiO_4$ | blue |
| 33 | $50SiO_2.10Al_2O_3.40ZnO.$ $0.3Lu_2O_3$ | 1000° C.-5H red. atm. | $Zn_2SiO_4$ | blue |
| 34 | $50SiO_2.10Al_2O_3.40ZnO.$ $0.2Tb_2O_3.0.5MnO$ | 950° C.-5H red. atm. | $Zn_2SiO_4$ | green |
| 35 | $50SiO_2.5Al_2O_3.35ZnO.$ $5MgO.5BaO.0.2MnO$ | 900° C.-5H red. atm. | $Zn_2SiO_4$ | green |

TABLE 4

| Example No. | Glass-ceramic composition | Heat treatment condition | Predominant crystal | Color phase |
|---|---|---|---|---|
| 36 | $47SiO_2.5B_2O_3.3Al_2O_3.$ $15Ga_2O_3.30ZnO.0.7MnO$ | 920° C.-2H red. atm. | $Zn_2SiO_4$ $ZnGa_2O_4$ | green |
| 37 | $54SiO_2.4Al_2O_3.36ZnO.$ $6Li_2O.0.1MnO$ | 850° C.-2H red. atm. | $Zn_2SiO_4$ | green |
| 38 | $56SiO_2.36ZnO.8Li_2O.$ $0.3MnO$ | 850° C.-2H red. atm. | $Zn_2SiO_4$ | green |
| 39 | $37SiO_2.9B_2O_3.8Ga_2O_3.$ $38ZnO.18MgO.0.1MnO$ | — | — | orange |

Example 40

As raw materials, $SiO_2$, $H_3BO_3$, $SrCO_3$, MgO, $Eu_2O_3$ and $Dy_2O_3$ were used. These materials were weighed so that the composition having, in molar ratio, $SiO_2=43$, $B_2O_3=2$, SrO=30, MgO=25, $Eu_2O_3=0.1$ and $Dy_2O_3=1$ would be obtained. These materials were mixed uniformly and melted at 1500° C. for three hours. Then, the homogenized molten glass was cast into a mold and annealed at 650° C. The obtained glass was further heat treated in a reducing atmosphere at 850° C. for three hours and thereafter was cooled to room temperature to produce transparent long-lasting phosphorescent glass-ceramics.

Figure 5:
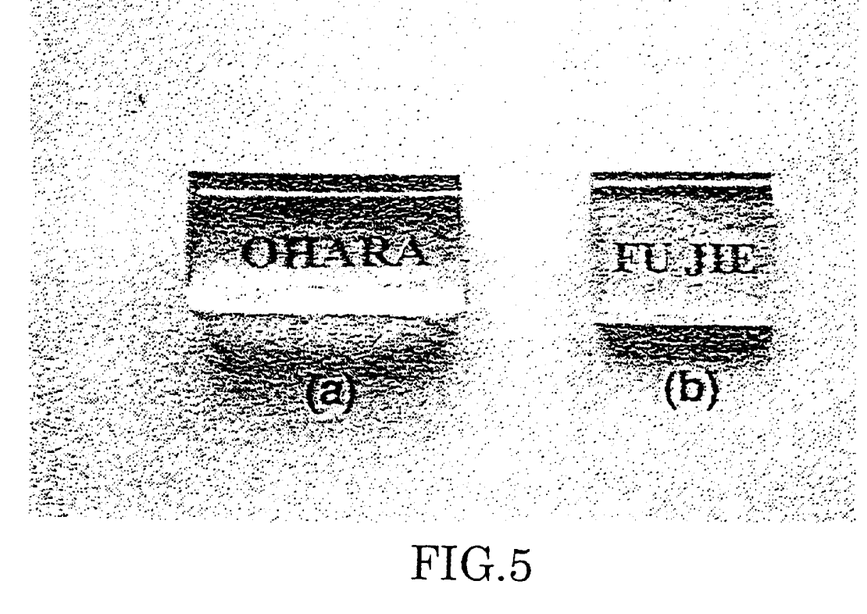
FIG. 5 is a photograph showing appearance of the glass-ceramics of the present invention in which (a) shows Example 40 and (b) shows Example 41.
Figure 6:
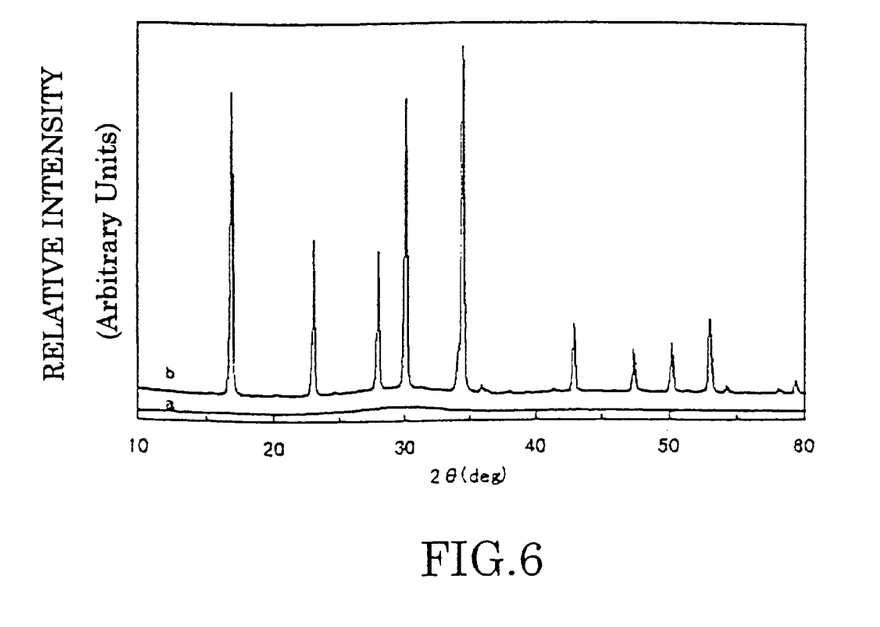
FIG. 6 is a graph showing the bulk X-ray diffraction patterns of Example 40 before and after the heat treatment in which (a) shows the state before the heat treatment (i.e., in the state of glass) and (b) shows the state after the heat treatment (i.e., in the state of glass-ceramic)
Figure 7:
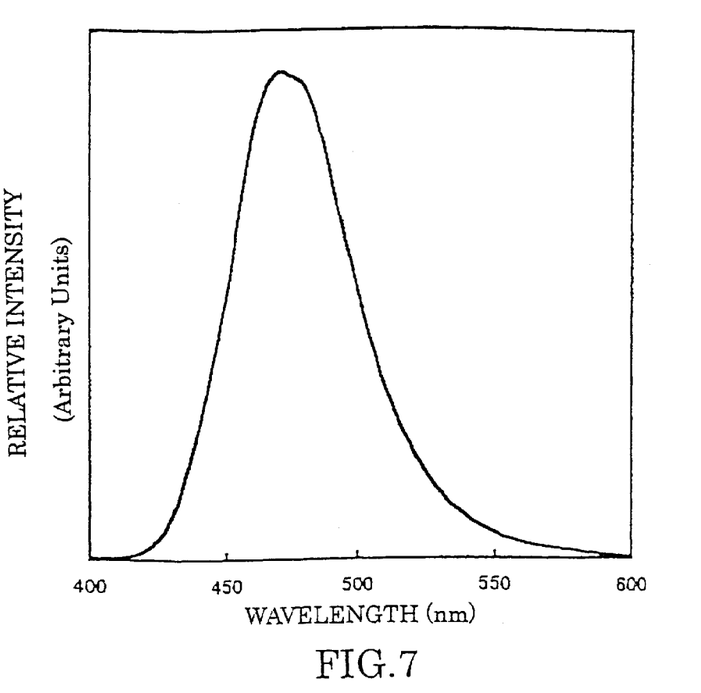
FIG. 7 is a graph showing the emission spectrum of Example 40 after stoppage of the excitation.

The photograph (a) of FIG. 5 shows the glass-ceramic. FIG. 6 shows bulk X-ray diffraction patterns of this example before and after the heat treatment. The example in the state (a) before the heat treatment exhibits a gradual curve which is specific to glass whereas the example in the state (b) (glass-ceramic state) after the heat treatment exhibits a curve having sharp peaks caused by a crystal phase. This shows that a large amount of crystals has grown from the glass by the heat treatment. Analysis has revealed that these peaks are caused by $Sr_2MgSi_2O_7$ crystal phase. FIG. 7 shows emission spectra of this example after stoppage of radiation of a fluorescent light. It has been confirmed that, by excitation with ultraviolet ray which has a shorter wavelength than fluorescent light, similar emission spectrum was also observed. As shown in FIG. 7, the glass-ceramic has a peak in the vicinity of 470 nm and emits phosphorescence over a wide range of wavelengths. Blue phosphorescence was observed in the dark for a long period of time.

Example 41

As raw materials, $SiO_2$, $H_3BO_3$, $SrCO_3$, $CaCO_3$, MgO, $ZrO_2$, $Eu_2O_3$ and $Dy_2O_3$ were used. These materials were weighed so that the composition having, in molar ratio, $SiO_2=44$, $B_2O_3=1$, SrO=23, CaO=5, MgO=25, $ZrO_2=0.5$, $Eu_2O_3=0.05$ and $Dy_2O_3=1$ would be obtained. These materials were mixed uniformly and melted at 1480° C. for three hours. Then, the homogenized molten glass was cast into a mold and annealed at 650° C. The obtained glass was further heat treated in a reducing atmosphere at 850° C. for two hours and thereafter was cooled to room temperature to produce transparent long-lasting phosphorescent glass-ceramics.

Figure 8:
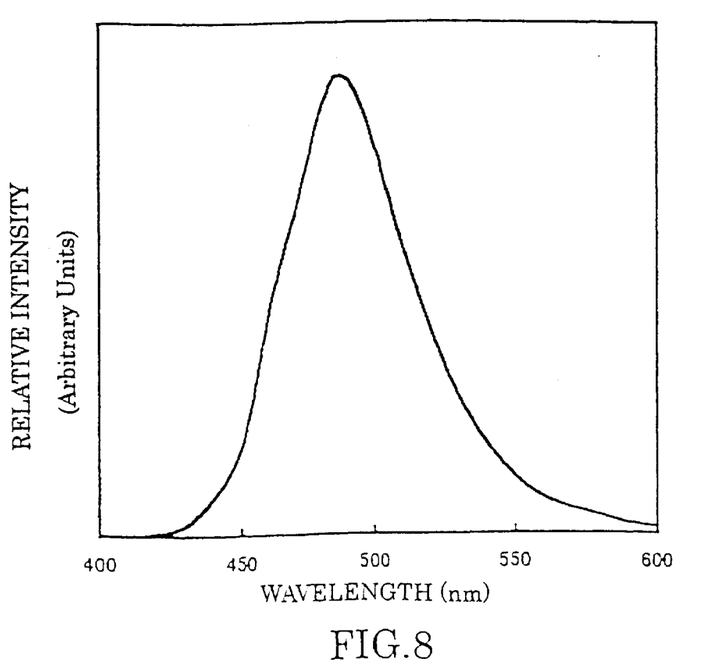
FIG. 8 is a graph showing the emission spectrum of Example 41 after stoppage of the excitation.

The photograph (b) of FIG. 5 shows the glass-ceramic. By the X-ray diffraction pattern analysis, the grown crystal phase has been found to be $(Sr_{1-x}Ca_x)_2MgSi_2O_7$ crystal phase. FIG. 8 shows emission spectrum of this example after stoppage of radiation of a fluorescent light. As shown in FIG. 8, the glass-ceramic has a peak in the vicinity of 490 nm and emit phosphorescence over a wide range of wavelengths. Bluish green phosphorescence was observed in the dark for a long period of time.

Example 42

As raw materials, $SiO_2$, $H_3BO_3$, $SrCO_3$, $CaCO_3$, MgO, $Eu_2O_3$ and $Dy_2O_3$ were used. These materials were weighed so that the composition having, in molar ratio, $SiO_2=40$, $B_2O_3=3$, SrO=29, CaO=8, MgO=20, $Eu_2O_3=0.05$ and $Dy_2O_3=0.5$ would be obtained. These materials were mixed uniformly and melted at 1580° C. for three hours. Then, the homogenized molten glass was poured into water to produce glass. The obtained glass was crushed and heat treated in an alumina crucible under a reducing atmosphere at 980° C. for five hours to produce long-lasting phosphorescent glass-ceramics.

Figure 9:
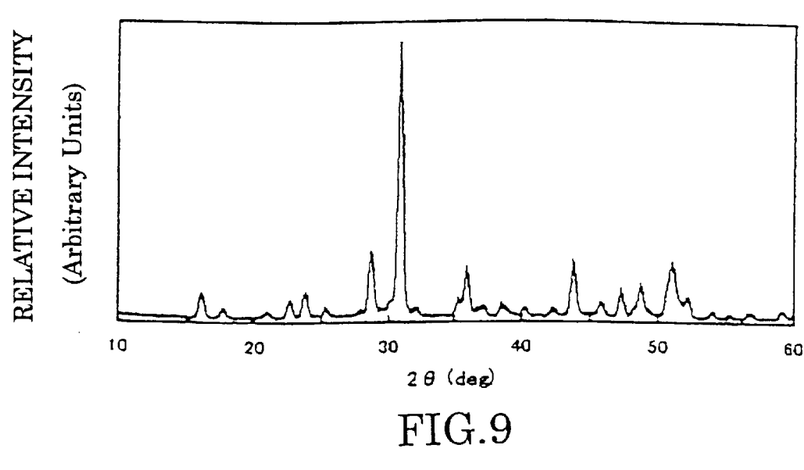
FIG. 9 is a graph showing the powder X-ray diffraction pattern of Example 42.

FIG. 9 shows powder X-ray diffraction pattern of the obtained specimen. The grown crystal phase has been found to be $(Sr_{1-x}Ca_x)_2MgSi_2O_7$ crystal phase. The glass-ceramic has a peak in the vicinity of 490 nm and bluish green phosphorescence was observed in the dark for a long period of time.

Examples 43 to 83

Examples 43 to 83 were prepared in a manner similar to Example 42. Compositions and colors of phosphorescence are described in Tables 5 to 8.

TABLE 5

| Example No. | Glass-ceramic composition | Heat treatment condition | Color*1 |
|---|---|---|---|
| 43 | $55SiO_2.30SrO.15MgO.0.1Eu_2O_3.0.1Dy_2O_3$ | 1100° C.-2H red. atm.*2 | blue |
| 44 | $46SiO_2.27SrO.27MgO.0.1Eu_2O_3.0.1Dy_2O_3$ | 1050° C.-3H red. atm. | blue |
| 45 | $45SiO_2.30SrO.25MgO.0.1Eu_2O_3.0.5Dy_2O_3$ | 1000° C.-3H red. atm. | blue |
| 46 | $44SiO_2.2B_2O_3.27SrO.27MgO.0.1Eu_2O_3.0.3Dy_2O_3$ | 1000° C.-3H red. atm. | blue |
| 47 | $43SiO_2.2B_2O_3.30SrO.25MgO.0.1Eu_2O_3.0.1Dy_2O_3$ | 1000° C.-3H red. atm. | blue |
| 48 | $43SiO_2.2B_2O_3.30SrO.25MgO.0.1Eu_2O_3.0.5Dy_2O_3$ | 1000° C.-3H red. atm. | blue |
| 49 | $43SiO_2.2B_2O_3.30SrO.25MgO.0.1Eu_2O_3.2Dy_2O_3$ | 1000° C.-3H red. atm. | blue |
| 50 | $43SiO_2.2B_2O_3.30SrO.25MgO.0.1Eu_2O_3.3Dy_2O_3$ | 1000° C.-3H red. atm. | blue |
| 51 | $43SiO_2.2B_2O_3.30SrO.25MgO.0.5Eu_2O_3.0.5Dy_2O_3$ | 1000° C.-3H red. atm. | blue |
| 52 | $41SiO_2.4B_2O_3.30SrO.25MgO.0.1Eu_2O_3.0.5Dy_2O_3$ | 1000° C.-3H red. atm. | blue |
| 53 | $40SiO_2.5B_2O_3.36SrO.19MgO.0.1Eu_2O_3.0.5Dy_2O_3$ | 1000° C.-3H red. atm. | blue |
| 54 | $43SiO_2.2B_2O_3.25SrO.5BaO.25MgO.0.1Eu_2O_3.0.5Dy_2O_3$ | 1000° C.-3H red. atm. | blue |

TABLE 6

| Example No. | Glass-ceramic composition | Heat treatment condition | Color |
|---|---|---|---|
| 55 | $41SiO_2.2B_2O_3.5Al_2O_3.27SrO.25MgO.0.1Eu_2O_3.0.5Dy_2O_3$ | 1000° C.-5H red. atm. | blue |
| 56 | $37SiO_2.6B_2O_3.3Al_2O_3.36SrO.18MgO.0.1Eu_2O_3.0.5Dy_2O_3$ | 1000° C.-3H red. atm. | blue |
| 57 | $42.8SiO_2.2B_2O_3.0.2Y_2O_3.30SrO.25MgO.0.1Eu_2O_3.0.1Dy_2O_3$ | 1000° C.-3H red. atm. | blue |
| 58 | $42.6SiO_2.2B_2O_3.0.4Y_2O_3.30SrO.25MgO.0.1Eu_2O_3.0.1Dy_2O_3$ | 1000° C.-3H red. atm. | blue |
| 59 | $42.7SiO_2.2B_2O_3.0.3Sc_2O_3.30SrO.25MgO.0.1Eu_2O_3.0.1Dy_2O_3$ | 1000° C.-3H red. atm. | blue |
| 60 | $42.8SiO_2.2B_2O_3.0.2Y_2O_3.30SrO.25MgO.0.1Eu_2O_3.0.1Tm_2O_3$ | 1000° C.-3H red. atm. | blue |
| 61 | $42.6SiO_2.2B_2O_3.0.4Y_2O_3.30SrO.25MgO.0.1Eu_2O_3.0.1Tm_2O_3$ | 1000° C.-3H red. atm. | blue |
| 62 | $41SiO_2.3B_2O_3.29SrO.7CaO.25MgO.0.05Eu_2O_3.0.5Dy_2O_3$ | 980° C.-5H red. atm. | bluish green |
| 63 | $45SiO_2.27SrO.6CaO.22MgO.0.05Eu_2O_3.0.5Dy_2O_3$ | 980° C.-3H red. atm. | bluish green |
| 64 | $43SiO_2.1B_2O_3.24SrO.7CaO.25MgO.0.05Eu_2O_3.0.5Dy_2O_3$ | 980° C.-5H red. atm. | bluish green |
| 65 | $42.5SiO_2.1B_2O_3.0.5P_2O_5.24SrO.7CaO.25MgO.0.05Eu_2O_3.0.5Dy_2O_3$ | 980° C.-3H red. atm. | bluish green |
| 66 | $42.5SiO_2.1B_2O_3.0.5ZrO_2.24SrO.7CaO.25MgO.0.05Eu_2O_3.0.5Dy_2O_3$ | 980° C.-3H red. atm. | bluish green |

TABLE 7

| Example No. | Glass-ceramic composition | Heat treatment condition | Color |
|---|---|---|---|
| 67 | $42.5SiO_2.1B_2O_3.0.5SnO_2.24SrO.7CaO.25MgO.0.05Eu_2O_3.0.5Dy_2O_3$ | 980° C.-3H red. atm. | bluish green |
| 68 | $42.2SiO_2.1.5B_2O_3.0.3Sb_2O_3.24SrO.7CaO.25MgO.0.05Eu_2O_3.0.5Dy_2O_3$ | 980° C.-5H red. atm. | bluish green |
| 69 | $42.5SiO_2.1B_2O_3.0.5Bi_2O_3.24SrO.7CaO.25MgO.0.05Eu_2O_3.0.5Dy_2O_3$ | 980° C.-5H red. atm. | bluish green |
| 70 | $42.2SiO_2.1B_2O_3.0.5PbO.24SrO.7CaO.25MgO.0.05Eu_2O.0.5Dy_2O_3$ | 980° C.-5H red. atm. | bluish green |
| 71 | $43SiO_2.1B_2O_3.3ZnO.24SrO.7CaO.22MgO.0.05Eu_2O_3.0.5Dy_2O_3$ | 980° C.-5H red. atm. | bluish green |
| 72 | $43SiO_2.1B_2O_3.4BaO.20SrO.7CaO.25MgO.0.05Eu_2O_3.0.5Dy_2O_3$ | 980° C.-5H red. atm. | bluish green |
| 73 | $43SiO_2.1B_2O_3.1Na_2O.23SrO.7CaO.25MgO.0.05Eu_2O_3.0.5Dy_2O_3$ | 980° C.-5H red. atm. | bluish green |
| 74 | $43SiO_2.1B_2O_3.24SrO.7CaO.20MgO.5MgF_2.0.05Eu_2O_3.0.5Dy_2O_3$ | 980° C.-5H red. atm. | bluish green |
| 75 | $43SiO_2.1B_2O_3.24SrO.7CaO.25MgO.0.05Eu_2O_3.0.25Nd_2O_3$ | 980° C.-5H red. atm. | bluish green |
| 76 | $43SiO_2.1B_2O_3.24SrO.7CaO.25MgO.0.05Eu_2O_3.0.5Nd_2O_3$ | 980° C.-5H red. atm. | bluish green |
| 77 | $41SiO_2.2B_2O_3.19SrO.19CaO.19MgO.0.05Eu_2O_3.0.5Dy_2O_3$ | 950° C.-5H red. atm. | green |
| 78 | $41SiO_2.2B_2O_3.8SrO.30CaO.19MgO.0.1Eu_2O_3.0.5Dy_2O_3$ | 950° C.-5H red. atm. | yellowish green |

TABLE 8

| Example No. | Glass-ceramic composition | Heat treatment condition | Color |
|---|---|---|---|
| 79 | $43SiO_2.2B_2O_3.8SrO.28CaO.19MgO.0.1Eu_2O_3.0.5Tm_2O_3$ | 950° C.-5H red. atm. | yellowish green |
| 80 | $41SiO_2.2B_2O_3.2Al_2O_3.8SrO.28CaO.19MgO.0.1Eu_2O_3.0.5Tm_2O_3$ | 950° C.-5H red. atm. | yellowish green |
| 81 | $40SiO_2.2B_2O_3.4Al_2O_3.8SrO.28CaO.18MgO.0.1Eu_2O_3.0.5Tm_2O_3$ | 950° C.-5H red. atm. | yellowish green |
| 82 | $40SiO_2.2B_2O_3.4Al_2O_3.8SrO.28CaO.18MgO.0.1Eu_2O_3.0.5Ho_2O_3$ | 950° C.-5H red. atm. | yellowish green |
| 83 | $41SiO_2.2B_2O_3.38CaO.19MgO.0.1Eu_2O_3.0.5Dy_2O_3$ | 950° C.-5H red. atm. | yellow |

*1 color of phosphorescence after stoppage of radiation of fluorescent light
*2 abbreviation of "reducing atmosphere"

As will be noted from these tables, various colors of phosphorescence can be realized by changing the type and composition ratio of the alkaline earth metal oxides More specifically, substitution of SrO by CaO, for example, shifts the emission peak to a longer wavelength side and substitution of SrO by BaO shifts the emission peak to a shorter wavelength side.

The powder X-ray diffraction pattern analysis shows that the sole crystal phase or predominant crystal phase present in all of the glass-ceramics of Examples 40 to 83 is alkaline earth metal silicate. From the result of the analysis that the compositions which contain zirconium exhibit improved phosphorescence characteristics than those which do not contain zirconium, it is assumed that zirconium precipitates from the glass in the glass-ceramics containing zirconium and enters into the structure of above mentioned crystal. A similar tendency was recognized also in yttrium and aluminum and shifting of the emission peak to a longer wavelength side was observed by addition of yttrium or aluminum. From these facts, it is assumed that yttrium or aluminum precipitates from the glass in the glass-ceramics containing yttrium or aluminum and enters into the structure of above mentioned crystal. The same is the cases for scandium and gallium.

The long-lasting phosphorescent glass-ceramics of the present invention have high phosphorescence brightness and very long life of phosphorescence. Table 9 shows relative phosphorescence brightness of some of the above described examples. The measurement of phosphorescence brightness was made by subjecting specimens to radiation with a fluorescent lamp of 600 luxes for 20 minutes and measuring phosphorescent brightness immediately after stoppage of radiation by a luminance meter. The relative phosphorescence brightness of Table 9 shows phosphorescence brightness of the specimens of the present invention in a case where phosphorescence brightness of the commercially available long-lasting phosphors upon lapse of 40 minutes after stoppage of radiation is 1.

TABLE 9

| Example No. | Composition | Relative phosphorescence brightness |
|---|---|---|
| 42 | $40SiO_2.3B_2O_3.29SrO.8CaO.20MgO.$ $0.05Eu_2O_3.0.5Dy_2O_3$ | 7 |
| 45 | $45SiO_2.30SrO.25MgO.0.1Eu_2O_3.$ $0.5Dy_2O_3$ | 8 |
| 49 | $43SiO_2.2B_2O_3.30SrO.25MgO.$ $0.1Eu_2O_3.2Dy_2O_3$ | 12 |
| 50 | $43SiO_2.2B_2O_3.30SrO.25MgO.$ $0.1Eu_2O_3.3Dy_2O_3$ | 6 |
| 51 | $43SiO_2.2B_2O_3.30SrO.25MgO.$ $0.5Eu_2O_3.0.5Dy_2O_3$ | 2 |
| 52 | $41SiO_2.4B_2O_3.30SrO.25MgO.$ $0.1Eu_2O_3.0.5Dy_2O_3$ | 4 |
| 53 | $40SiO_2.5B_2O_3.36SrO.19MgO.$ $0.1Eu_2O_3.0.5Dy_2O_3$ | 3 |
| 63 | $45SiO_2.27SrO.6CaO.$ $22MgO.0.05Eu_2O_3.0.5Dy_2O_3$ | 6 |
| 64 | $43SiO_2.1B_2O_3.24SrO.7CaO.$ $25MgO.0.05Eu_2O_3.0.5Dy_2O_3$ | 5 |
| Comparative Example | ZnS:Cu | 1 |

It will be understood from Table 9 that the phosphorescence brightness of the glass-ceramics of the present invention is much higher than that of the commercially available long-lasting phosphors. In the case of Example 49, for example, the phosphorescence brightness was recognized even after 60 hours. Since glass-ceramics of the same composition exhibit different physical properties if conditions of heat treatment are different, further improvement in the phosphorescence brightness can be expected by optimizing the heat treatment conditions for these glass-ceramics.

Example 84

Glass obtained by melting raw materials at 1520° C. for three hours and then quenching the molten glass in water and having the composition of $45SiO_2.30SrO.20MgO.0.05Eu_2O_3.0.5Dy_2O_3$ was crushed to particles of 45 μm or below and 2 g of this base glass was mixed well with the following materials:

| | |
|---|---|
| $SiO_2$ | 3.87 g |
| $SrCO_3$ | 9.51 g |
| MgO | 1.30 g |
| $Eu_2O_3$ | 0.03 g |
| $Dy_2O_3$ | 0.30 g |

The mixture was put in an alumina crucible and was sintered at 1300° C. for two hours in a reducing atmosphere of 97% nitrogen and 3% hydrogen to produce long-lasting phosphorescent glass-ceramic which emits blue phosphorescence. The predominant crystal phase present in the sample was $Sr_2MgSi_2O_7$. After crushed and sieved, the glass-ceramic was subjected to radiation of a fluorescent light at 600 luxes for 20 minutes. The phosphorescence brightness after the radiation is shown as the curve (a) in FIG. 10.

Example 85

Glass obtained by melting raw materials at 1500° C. for three hours and then quenching the molten glass in water and having the composition of $45SiO_2.22SrO.6CaO.27MgO.0.05Eu_2O_3.0.5Dy_2O_3$ was crushed to particles of 45 μm or below and 1.5 g of this base glass was mixed well with the following materials:

| | |
|---|---|
| $SiO_2$ | 3.87 g |
| $SrCO_3$ | 9.51 g |
| MgO | 1.30 g |
| $Eu_2O_3$ | 0.03 g |
| $Dy_2O_3$ | 0.30 g |

The mixture was put in an alumina crucible and was sintered under the same condition as in Example 84 to produce long-lasting phosphorescent glass-ceramic which emits blue phosphorescence. The predominant crystal phase present in the sample was $(Sr_{1-x}Ca_x)_2MgSi_2O_7$. After crushed and sieved, the glass-ceramic was subjected to radiation of a fluorescent light at 600 luxes for 20 minutes. The phosphorescence brightness after the radiation is shown as the curve (b) in FIG. 10.

Comparative Example 1

| | |
|---|---|
| $SiO_2$ | 3.87 g |
| $SrCO_3$ | 9.51 g |
| MgO | 1.30 g |
| $Eu_2O_3$ | 0.03 g |
| $Dy_2O_3$ | 0.30 g |

These materials were well mixed and the mixture was put in an alumina crucible and was fired at 1300° C. for two hours in a reducing atmosphere of 97% nitrogen and 3% hydrogen to produce alkaline earth silicate type long-lasting phosphors consisting of ceramics (sintered products) having the composition of $40SiO_2.40SrO.20MgO.0.05Eu_2O_3.0.5Dy_2O_3$ which emits blue phosphorescence. After crushed and sieved, the sample was subjected to radiation by a fluorescent light at 600 luxes for 20 minutes. Phosphorescence brightness after the radiation is shown as the curve (c) in FIG. 10.

Figure 10:
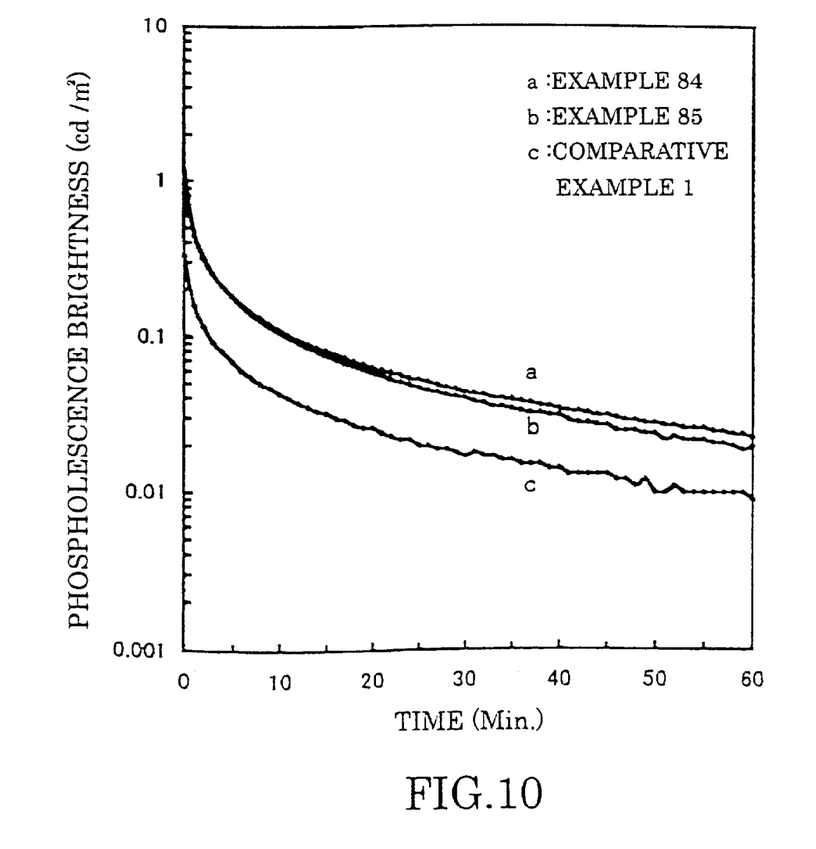
FIG. 10 is a graph showing decay curves of the phosphorescence brightness of Example 84, Example 85 and Comparison Example 1.

It will be apparent from FIG. 10 that the long-lasting phosphorescent glass-ceramics of the present invention which are produced by mixing the base glass with the other specific materials and sintering the mixture have much higher phosphorescence brightness than the long-lasting phosphors consisting of ceramics (sintered products) produced by the conventional sintering process notwithstanding that there is only slight difference in the composition between them.

Example 86

Glass obtained by melting raw materials at 1500° C. for three hours and then quenching the molten glass in water and having the composition of $45SiO_2.22SrO.6CaO.27MgO.$ 0.1Eu₂O₃.0.5Dy2O₃ was crushed to particles of 45 μm or below and 12.0 g of this base glass was mixed well with the following materials:

| | |
|---|---|
| Al₂O₃ | 0.803 g |
| SrCO₃ | 1.162 g |
| Eu₂O₃ | 0.005 g |
| Dy₂O₃ | 0.029 g |

The mixture was put in an alumina crucible and was sintered at 1100° C. for two hours in a reducing atmosphere of 97% nitrogen and 3% hydrogen to produce long-lasting phosphorescent glass-ceramic which emits bluish green phosphorescence. After crushed and sieved, the glass-ceramic was subjected to radiation of a fluorescent light at 600 luxes for 20 minutes. The phosphorescence brightness after the radiation is shown as the curve (a) in FIG. 11.

Example 87

Glass obtained by melting raw materials at 1500° C. for three hours and then quenching the molten glass in water and having the composition of 45SiO₂.22SrO.6CaO.27MgO.0.1Eu₂O₃.0.5Dy₂O₃ was crushed to partic of 45 μm or below and 1.0 g of this base glass was mixed well with the following materials:

| | |
|---|---|
| Al₂O₃ | 6.02 g |
| SrCO₃ | 8.72 g |
| Eu₂O₃ | 0.04 g |
| Dy₂O₃ | 0.22 g |

The mixture was put in an alumina crucible and was at 1300° C. for two hours in a reducing atmosphere of 97% nitrogen and 3% hydrogen to produce long-lasting phosphorescent glass-ceramic which emits green phosphorescence. After crushed and sieved, the glass-ceramic was subjected to radiation of a fluorescent light at 600 luxes for 20 minutes. The phosphorescence brightness after the radiation is shown as the curve (b) in FIG. 11.

Comparative Example 2

| | |
|---|---|
| Al₂O₃ | 6.02 g |
| SrCO₃ | 8.72 g |
| Eu₂O₃ | 0.04 g |
| Dy₂O₃ | 0.22 g |

These materials were well mixed and the mixture was put in an alumina crucible and was fired at 1300° C. for two hours in a reducing atmosphere of 97% nitrogen and 3% hydrogen to produce alkaline earth aluminate type long-lasting phosphors consisting of sintered products having the composition of 50Al₂O₃.50SrO.0.1Eu₂O₃.0.5Dy₂O₃ which emits green phosphorescence. After crushed and sieved, the sample was subjected to radiation by a fluorescent light at 600 luxes for 20 minutes. Phosphorescence brightness after the radiation is shown as the curve (c) in FIG. 11.

Figure 11:
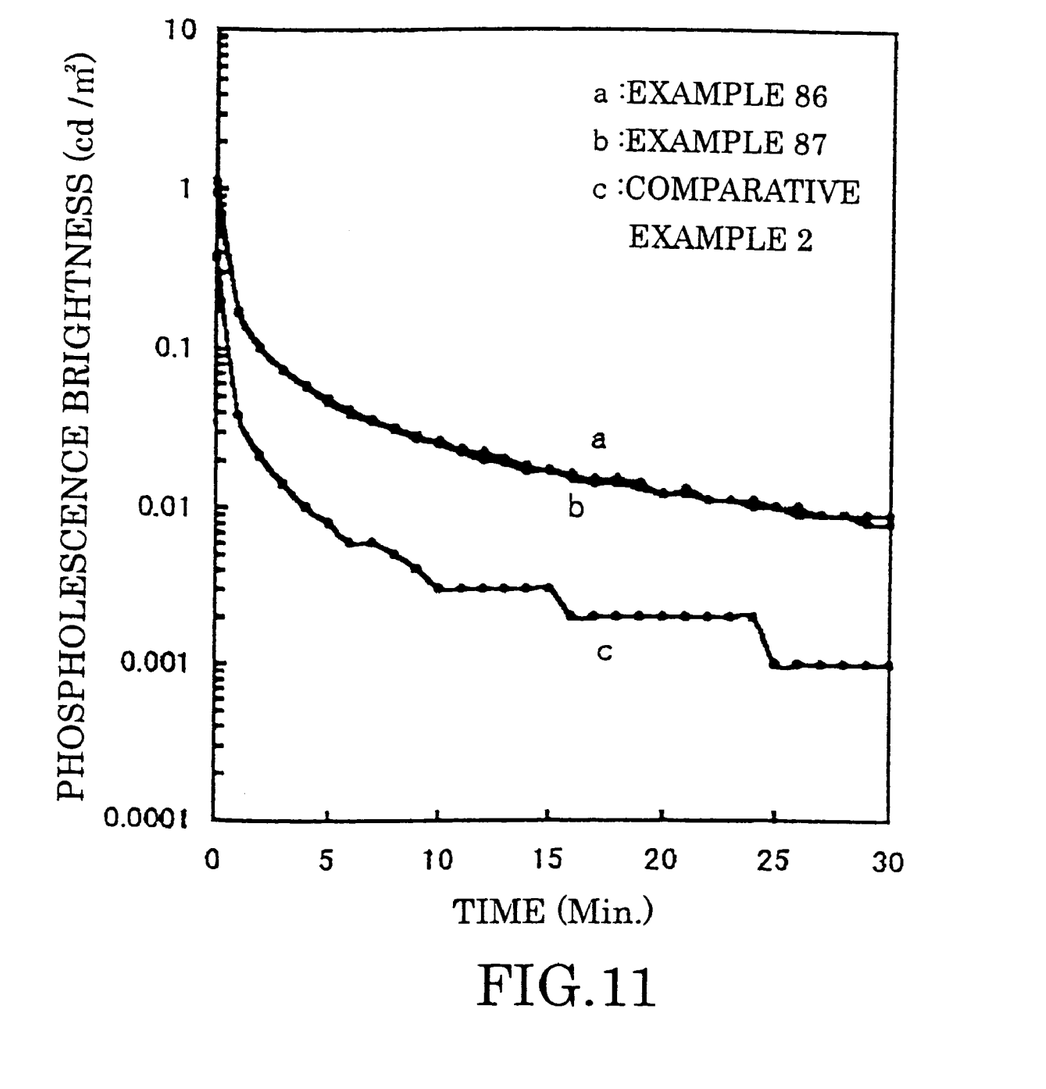
FIG. 11 is a graph showing decay curves of the phosphorescence brightness of Example 86, Example 87 and Comparative Example 2.

It will be apparent from FIG. 11 that the long-lasting phosphorescent glass-ceramics of the present invention emitting bluish green or green phosphorescence which are produced by mixing the base glass with the other specific materials and sintering the mixture have much higher phosphorescence brightness than the long-lasting phosphors of Comparative Example 2 consisting of ceramics (sintered products) produced by the conventional sintering process.

Example 88

Glass obtained by melting raw materials at 1520° C. for three hours and then quenching the molten glass in water and having the composition of 45SiO₂.33SrO.22MgO.0.05Eu₂O₃.0.5Dy₂O₃ was crushed to particles of 10 μm or below and 8 g of this base glass was mixed well with 2 g of Y₂O₃.

The mixture was put in a mold and press-formed and then was sintered at 1200° C. for five hours in a reducing atmosphere to produce glass-ceramic which emits blue phosphorescence. The glass-ceramic was subjected to radiation of a fluorescent light at 600 luxes for 15 minutes. The phosphorescence lasting for more than 24 hours in the dark was observed.

Example 89

9.5 g of the base glass of Example 88 was mixed well with 0.5 g of ZrO₂. The mixture was put in a mold and press-formed and then was sintered by heat treating it at 1180° C. for six hours in a reducing atmosphere to produce glass-ceramics which emit blue phosphorescence. The glass-ceramic was subjected to radiation of a fluorescent light at 600 luxes for 15 minutes. The phosphorescence lasting for more than 24 hours in the dark was observed.

According to the present invention, long-lasting phosphorescent glass-ceramics having high phosphorescence brightness and long-lasting phosphorescence and presenting various phosphorescence colors can be produced easily in the form of transparent bulk and also in the form of powder. These glass-ceramics can be used for a wider range of applications than the prior art long-lasting phosphors including visible indications, various marks, decorations, recreation goods, building materials etc.

What is claimed is:
1. Long-lasting phosphorescent glass-ceramics having a composition in mol % of:

| | |
|---|---|
| SiO₂ | 30–70% |
| GeO₂ | 0–10% |
| MgO | 5–40% |
| MO | 10–55% | where M is an element or elements selected from the group consisting of Ca, Sr and Ba

| | |
|---|---|
| B₂O₃ | 0–15% |
| Y₂O₃ | 0–10% |
| Sc₂O₃ | 0–10% |
| Al₂O₃ | 0–10% |
| Ga₂O₃ | 0–15% |
| MeO | 0–10% | where Me is an element or elements selected from the group consisting of Be, Zn, Cd and Pb

| | |
|---|---|
| $R_2O$ | 0–6% | where R is an element or elements selected from the group consisting of Li, Na and K

| | |
|---|---|
| Cl + F | 0–8% |
| $Bi_2O_3$ | 0–8% |
| $P_2O_5 + ZrO_2 + SnO_2$ | 0–6% and |
| $Sb_2O_3 + As_2O_3$ | 0–4%, | said composition further comprising in mol %, as an activator,

| | |
|---|---|
| $Eu_2O_3$ | 0.0001–5% | and, as an auxiliary activator,

| | |
|---|---|
| $Ln_2O_3$ | 0.0001–6% | where Ln is an element or elements selected from the group consisting of Ce, Pr, Nd, Sm, Gd, Tb, Dy, Ho, Er, Tm, Yb and Lu.

2. Long-lasting phosphorescent glass-ceramics as defined in claim 1 comprising, as a predominant crystal phase, $M_2MgSi_2O_7$ where M is an element or elements selected from the group consisting of Ca, Sr and Ba.

3. Long-lasting phosphorescent glass-ceramics as defined in claim 1 where the amount of $B_2O_3$ is 0.005–10 mol %.

4. Long-lasting phosphorescent glass-ceramics as defined in claim 1 where the amount of $Y_2O_3$ is 0.005–6 mol %.

5. Long-lasting phosphorescent glass-ceramics as defined in claim 1 where the amount of $Al_2O_3$ is 0.005–6 mol %.

6. Long-lasting phosphorescent glass-ceramics as defined in claim 1 where the amount of $P_2O_5+ZrO_2+SnO_2$ is 0.005–5 mol %.

7. Long-lasting phosphorescent glass-ceramics having a composition comprising in mol %:

| | |
|---|---|
| $SiO_2$ | 30–65% |
| ZnO | 20–50% |
| $Al_2O_3$ | 0–20% |
| $Ga_2O_3$ | 0–20% |
| $B_2O_3$ | 0–15% |
| MO | 0–20% | where M is an element or elements selected from the group consisting of Mg, Ca, Sr and Ba

| | |
|---|---|
| $R_2O$ | 0–15% | where R is an element or elements selected from the group consisting of Li, Na and K, and

| | |
|---|---|
| $P_2O_5 + ZrO_2 + SnO_2$ | 0–8% | said composition further comprising 0–5 mol % of $Ln_2O_3$ as an activator or auxiliary activator wherein Ln is Eu or Dy.

8. Long-lasting phosphorescent glass-ceramics as defined in claim 7 wherein M is an element or elements selected from the group consisting of Ca, Sr and Ba.

9. Long-lasting phosphorescent glass-ceramics as defined in claim 7 comprising a $Zn_2SiO_4$ crystal phase.

10. Long-lasting phosphorescent glass-ceramics obtained by heat treating a base glass having a composition in mol % of:

| | |
|---|---|
| $SiO_2$ | 30–70% |
| $GeO_2$ | 0–10% |
| MgO | 5–40% |
| MO | 10–55% | where M is an element or elements selected from the group consisting of Ca, Sr and Ba

| | |
|---|---|
| $B_2O_3$ | 0–15% |
| $Y_2O_3$ | 0–10% |
| $Sc_2O_3$ | 0–10% |
| $Al_2O_3$ | 0–10% |
| $Ga_2O_3$ | 0–15% |
| MeO | 0–15% | where Me is an element or elements selected from the group consisting of Be, Zn, Cd and Pb

| | |
|---|---|
| $R_2O$ | 0–6% | where R is an element or elements selected from the group consisting of Li, Na and K

| | |
|---|---|
| Cl + F | 0–8% |
| $Bi_2O_3$ | 0–8% |
| $P_2O_5 + ZrO_2 + SnO_2$ | 0–6% and |
| $Sb_2O_3 + As_2O_3$ | 0–4% | said composition further comprising in mol % as an activator

| | |
|---|---|
| $Eu_2O_3$ | 0.0001–5% | and as an auxiliary activator

| | |
|---|---|
| $Ln_2O_3$ | 0.0001–6% | where Ln is an element or elements selected from the group consisting of Ce, Pr, Nd, Sm, Gd, Tb, Dy, Ho, Er, Tm, Yb and Lu.

11. Long-lasting phosphorescent glass-ceramics obtained by mixing a base glass with one or more compounds selected from the group consisting of $SiO_2$, $ZrO_2$, $B_2O_3$, $Al_2O_3$, $Y^2O_3$, BaO, SrO, CaO, MgO, $Eu_2O_3$, $Nd_2D_3$, $Dy_2O_3$, $Ho_2O_3$ and $Tm_2O_3$ and compounds which can be converted to them, and sintering a mixture of the base glass and the compound or compounds, and said base glass having a composition in mol % of:

| | |
|---|---|
| $SiO_2$ | 30–70% |
| $GeO_2$ | 0–10% |
| MgO | 5–40% |
| MO | 10–55% | where M is an element or elements selected from the group consisting of Ca, Sr and Ba

| | |
|---|---|
| $B_2O_3$ | 0–15% |
| $Y_2O_3$ | 0–10% |
| $Sc^2O_3$ | 0–10% |
| $Al_2O_3$ | 0–10% |
| $Ga_2O_3$ | 0–15% |
| MeO | 0–15% | where Me is an element or elements selected from the group consisting of Be, Zn, Cd and Pb

| | |
|---|---|
| $R_2O$ | 0–6% | where R is an element or elements selected from the group consisting of Li, Na and K

| | |
|---|---|
| Cl + F | 0–8% |
| $Bi_2O_3$ | 0–8% |
| $P_2O_5 + ZrO_2 + SnO_2$ | 0–6% and |
| $Sb_2O_3 + As_2O_3$ | 0–4% | said composition further comprising in mol % as an activator

| | |
|---|---|
| $Eu_2O_3$ | 0.0001–5% | and as an auxiliary activator

| | |
|---|---|
| $Ln_2O_3$ | 0.0001–6% | where Ln is an element or elements selected from the group consisting of Ce, Pr, Nd, Sm, Gd, Tb, Dy, Ho, Er, Tm, Yb and Lu.

* * * * *